United States Patent [19]

Bemis et al.

[11] 4,296,164

[45] Oct. 20, 1981

[54] FIBROUS GLASS BLOWING INSULATION AND PROCESS

[75] Inventors: Richard S. Bemis, Granville; Daniel A. McCartan, Heath, both of Ohio

[73] Assignee: Owens-Corning Fiberglas Corporation, Toledo, Ohio

[21] Appl. No.: 168,954

[22] Filed: Jul. 11, 1980

Related U.S. Application Data

[63] Continuation of Ser. No. 52,518, Jun. 27, 1979, abandoned, which is a continuation-in-part of Ser. No. 930,946, Aug. 4, 1978, abandoned.

[51] Int. Cl.³ .............................................. B32B 17/00
[52] U.S. Cl. ..................................... 428/219; 65/4.4; 156/167; 156/181; 156/250; 156/254; 264/118; 264/128; 428/218; 428/220; 428/288; 428/392; 428/402; 428/426
[58] Field of Search ............... 428/219, 220, 288, 392, 428/402, 426; 65/4 R; 264/118, 128; 156/62.4, 62.6, 167, 181, 250, 254, 152, 259, 271

[56] References Cited

U.S. PATENT DOCUMENTS

| | | | |
|---|---|---|---|
| 2,219,285 | 10/1940 | Allen et al. | 156/62.4 |
| 2,233,433 | 3/1941 | Smith | 428/392 |
| 2,579,035 | 12/1951 | Edelman | 252/62 |
| 2,618,817 | 11/1952 | Slayter | 19/161 |
| 3,736,215 | 5/1973 | Felder et al. | 156/271 |
| 3,932,161 | 1/1976 | McNish | 65/4 R |

Primary Examiner—James J. Bell
Attorney, Agent, or Firm—Ronald C. Hudgens; Philip R. Cloutier; Paul J. Rose

[57] ABSTRACT

Fibrous glass blowing insulation is made by slitting and crosscutting a blanket of fibrous glass wool into small columns and conveying the columns to a bagging machine, the columns normally breaking up at random during conveying and packaging into approximate cubes and smaller flakes or prisms of various thicknesses.

21 Claims, 12 Drawing Figures

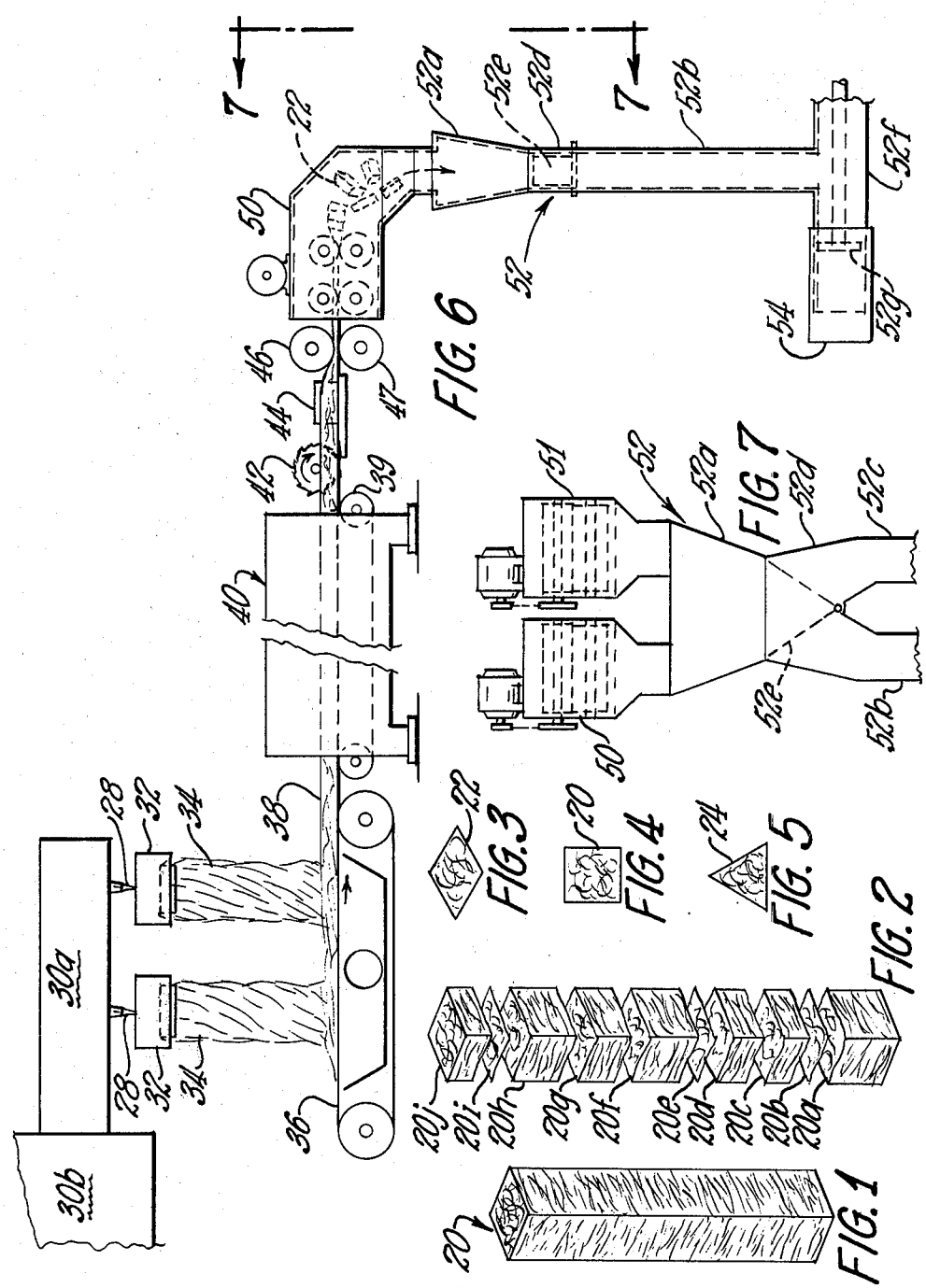

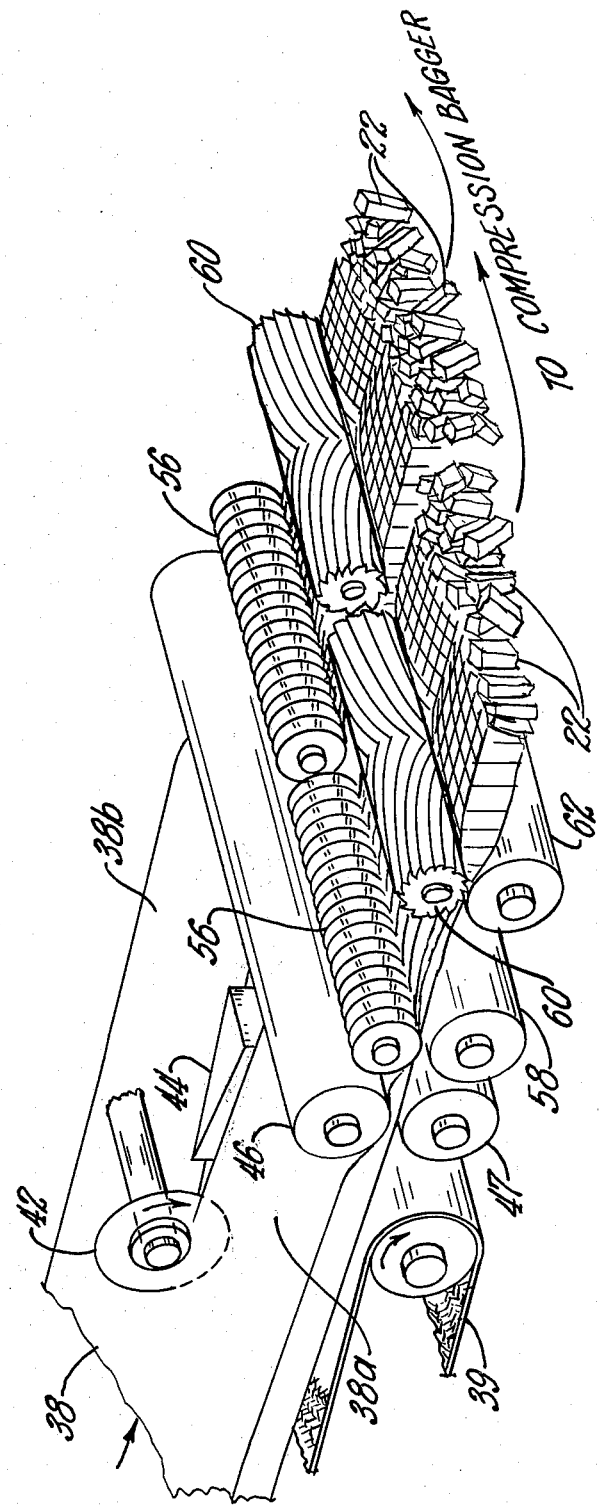

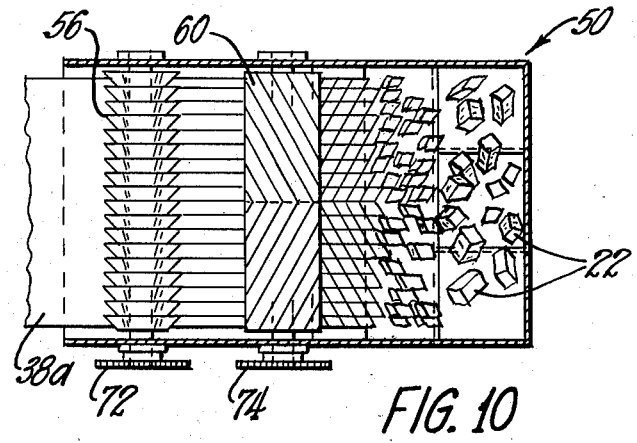
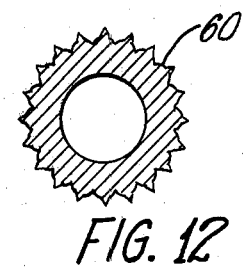
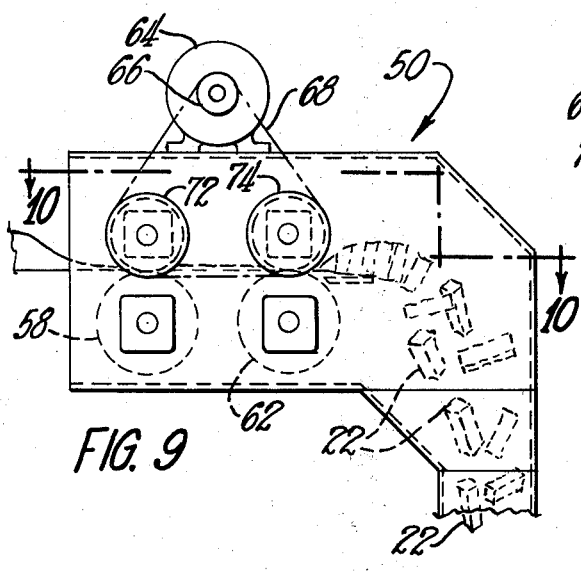
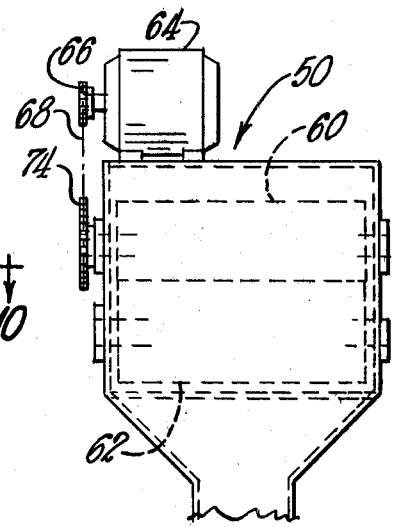

FIBROUS GLASS BLOWING INSULATION AND PROCESS

RELATED APPLICATION

This is a continuation of, application Ser. No. 052,518, filed June 27, 1979, now abandoned which is a continuation-in-part of application Ser. No. 930,946, filed Aug. 4, 1978 now abandoned.

TECHNICAL FIELD

This invention relates generally to blowing wool insulation, and more particularly to fibrous glass flakes for blowing into enclosed spaces as insulation.

BACKGROUND ART

For a number of years the commercial process of making blowing wool insulation has included the use of a hammermill wherein rotating hammers in a casing break up masses of fibrous glass wool and force it through a plate having a plurality of orifices to form it into irregularly shaped nodules.

A non-commercial process of making blowing wool nodules is disclosed in U.S. Pat. No. 2,219,285, issued on Oct. 29, 1940, to Frank E. Allen and Harry V. Smith. In this patent, masses of fibrous glass wool are picked apart and the fibers are reformed into an even mat which is sprayed with water and slit and chopped into cubes. The cubes are advanced through troughs in which they are paddled by a series of rotating beater blades and rolled into nodules.

DISCLOSURE OF INVENTION

By the present invention, columns of fibrous glass blowing wool are produced and bagged without any beating or paddling into nodules. The columns break up at random, during the bagging process and when blown into place for insulation, into smaller prisms, approximate cubes, or flakes of various thicknesses. A lesser weight of flakes can be used than the weight of hammermilled nodules required for equivalent insulation value.

An object of the invention is to provide improved blowing wool insulation.

Another object is to provide an improved process for making blowing wool insulation.

Another object is to provide a method of obtaining the same insulation value with a lesser weight of fibrous glass blowing wool.

BRIEF DESCRIPTION OF DRAWINGS

FIG. 1 is a perspective view of a column of blowing wool as it could be made in accordance with the invention;

FIG. 2 is a perspective view representative of prisms, approximate cubes, or smaller flakes into which the column of FIG. 1 breaks at random upon handling;

FIG. 3 is a plan view of a column of blowing wool as it would be produced by the apparatus disclosed herein;

FIG. 4 is a plan view of the column of FIG. 1;

FIG. 5 is a plan view of an alternatively shaped column of triangular cross section;

FIG. 6 is a schematic side elevational view of apparatus used to produce the blowing wool insulation of the invention;

FIG. 7 is a fragmentary end elevational view taken generally in the direction of arrows 7—7 of FIG. 6;

FIG. 8 is a fragmentary enlarged perspective view of a slitting and crosscutting portion of the apparatus of FIG. 6;

FIG. 9 is a fragmentary enlarged side elevational view of a slitting and crosscutting portion of the apparatus of FIG. 6;

FIG. 10 is a fragmentary sectional view taken generally along the line 10—10 of FIG. 9;

FIG. 11 is a fragmentary end elevational view of the apparatus of FIG. 9; and

FIG. 12 is an enlarged cross sectional view of one of the crosscutting rolls of the apparatus of FIG. 6.

BEST MODE OF CARRYING OUT INVENTION

With respect to the drawings, FIG. 1 shows a column 20 of fibrous glass blowing insulation as it could be produced by the slitting and crosscutting of a fibrous glass blanket in accordance with the invention. A plan view of the column 20 is shown in FIG. 4. FIG. 2 shows the column 20 broken apart into a representative approximate cube 20a and representing smaller flakes or prisms 20b, 20c, 20d, 20e, 20f, 20g, 20h, 20i, and 20j. The column 20 breaks apart at random into flakes of various thicknesses upon handling, bagging, and blowing into an attic space as insulation. By way of example, the column 20 may be about three and one-half to five inches (8.9 to 12.7 cm.) in height and measure about one-half inch (1.27 cm.) between each pair of opposite sides in the plan view, it being understood that other dimensions and shapes may be used without departing from the spirit and scope of the invention. FIG. 3 shows an alternative diamond-shaped column 22 which would be produced by the apparatus disclosed herein and FIG. 6 shows an alternatively shaped triangular column 24.

In FIG. 6 apparatus for making the columns 22 of blowing wool is schematically shown. Streams 28 of molten glass are supplied from the forehearth 30a of a furnace 30b to conventional rotary fiberizers 32 to form veils 34 of glass fibers which are collected on a conveyor 36 to form a fibrous glass blanket 38. While only two rotary fiberizers 32 are shown, in actual practice there are generally several and frequently as many as twelve. The individual glass fibers of the veils 34 assume generally horizontal positions on the conveyor 36. As a result, the blanket 38 has a generally laminar structure. A thermosetting binder which is primarily a mixture of phenol formaldehyde and urea formaldehyde is sprayed on the glass fibers in the veils 34 by means not shown. Normally spraying nozzles are mounted on the outer shields of the rotary fiberizers 32. The blanket 38 is conveyed by a conveyor 39 through a curing oven 40 wherein the binder is cured to bond the fibers to each other. A rotary saw 42 downstream of the curing oven 40 slits the blanket 38 into two segments 38a and 38b, as best shown in FIG. 8, and a wedge 44 moves the segments 38a and 38b apart before they are fed between a pair of compression rolls 46 and 47. The blanket segment 38a is then fed to an enclosed slitting and crosscutting mechanism 50 while the blanket segment 38b is fed to an identical slitting and crosscutting mechanism 51 (FIG. 7). In the mechanisms 50 and 51, the blanket segments are longitudinally slit and crosscut into columns such as the column 22 and the columns, by way of example, may be delivered to a common hopper 52a forming part of a conventional bagging machine 52. The bagging machine 52 includes a pair of ducts 52b and 52c having a common junction 52d joined to the hopper 52a. Within the junction 52d is a pivotable diverting plate 52e which selectively blocks one of the ducts 52b and 52c while diverting the output of columns 22 from the hopper 52a to the other duct. Each of the ducts is connected to a bagging chamber such as the chamber 52f having a piston 52g therein for compressing columns 22 into a bag 54.

The mechanism 5 is best shown in FIGS. 9-11, it being understood that mechanism 51 is identical. The mechanism 50 includes a slitting roll 56 with a back-up roll 58 and a rotary die or crosscutting roll 60 with a back-up roll 62, each roll having an appropriate shaft and bearings. A motor 64 having a sprocket wheel 66 drives the slitting roll 56 and the crosscutting roll 60 by means of a chain 68 and sprocket wheels 72 and 74 respectively operatively connected to the rolls.

The roll 56 includes a plurality of frustoconical slitting discs. The roll 60 resembles a double helical or herringbone gear with cutting edges as best shown in FIG. 12. Columns such as column 20 of FIGS. 1 and 4 could be cut with cutting edges extending axially of the roll, but it is believed that the herringbone pattern, which cuts columns of diamond shape as shown in FIG. 3, will result in longer life for the cutting edges. In actual practice, a small amount of clearance is provided between the slitting roll 56 and its back-up roll 58 and also between the crosscutting roll 60 and its back-up roll 62. The blanket segments 38a and 38b are compressed during slitting and crosscutting, but the columns such as column 22 expand upon release substantially back to the original blanket thickness.

In a test conducted to demonstrate the improvement provided by the invention, standard hammermilled blowing wool was compared with the blowing wool of this invention. The hammermilled blowing wool had a blown density (d) of 0.67 pounds per cubic foot (10.74 kg. per cubic meter) and conductivity (k) of 0.461 British thermal units/(hour)(square foot)(degree Fahrenheit/inch) at that density, while the glass wool flakes or prisms had a blown density of 0.475 pounds per cubic foot (7.614 kg. per cubic meter) and a conductivity of 0.529 British thermal units/(hour)(square foot)(degree Fahrenheit/inch), the conductivity being measured at 75 degrees Fahrenheit (24 degrees Celsius) mean temperature. In metric units, this is a conductivity (k) in calories/(hour)(square centimeter)(degree Celsius/centimeter) of 0.572 for the hammermilled blowing wool and 0.656 for the glass wool flakes or prisms.

The amount of insulation required per unit of thermal resistance is directly proportional to the thermal conductivity and density. Using the above figures, for equal insulation values, only 81 percent as much weight of the flakes or prisms would have to be used as hammermilled blowing wool [k×d for flakes ÷ k×d for hammermilled = (0.529×0.475)/(0.461×0.67) = 0.81]. This represents a savings of 19% in the weight of glass wool required for the same insulation value.

The base wool, from which the hammermilled blowing wool and the flaked blowing wool samples for the above test were produced, had a density of 0.615 pounds per cubic foot (9.858 kg. per cubic meter), a binder content of 4.5 percent, and a fiber diameter of 0.00028 inches (0.00071 cm.). However, this base wool has been stored under compression. The density of the blanket 38 as formed would be about 0.45 pounds per cubic foot (7.21 kg. per cubic meter).

Various modifications may be made in the structure shown and described without departing from the spirit and scope of the invention.

We claim:

1. Blowing insulation comprising fibrous glass prisms, approximate cubes, and flakes of various thicknesses, formed by delamination of columns at random upon handling, the columns having been cut from a generally laminated blanket of bonded glass fibers in such a manner that a maximum dimension of each column initially extends in the direction of a minimum dimension or thickness of the blanket, and the blowing insulation having a product of conductivity (k) and density (d) of less than 0.27 in a blown condition, where (k) is measured in terms of British thermal units/(hour)(square foot)(degree Fahrenheit/inch) at 75 degrees Fahrenheit mean temperature and (d) is measured in terms of pounds per cubic foot (less than 5.37 in a blown condition, where (k) is measured in terms of calories/(hour)(square centimeter)(degree Celsius/centimeter) at 24 degrees Celsius mean temperature and (d) is measured in terms of kilograms per cubic meter).

2. Blowing insulation as claimed in claim 1 wherein the product of conductivity (k) and density (d) in the blown condition is less than 0.26, where (k) is measured in terms of British thermal units/(hour)(square foot)(degree Fahrenheit/inch) at 75 degrees Fahrenheit mean temperature and (d) is measured in terms of pounds per cubic foot (less than 5.17 where (k) is measured in terms of calories/(hour)(square centimeter)(degree Celsius/centimeter) at 24 degrees Celsius mean temperature and (d) is measured in terms of kilograms per cubic meter).

3. Blowing insulation as claimed in claim 1 wherein the product of conductivity (k) and density (d) in the blown condition is less than 0.252, where (k) is measured in terms of British thermal units/(hour)(square foot)(degree Fahrenheit/inch) at 75 degrees Fahrenheit mean temperature and (d) is measured in terms of pounds per cubic foot (less than 5.01 where (k) is measured in terms of calories/(hour)(square centimeter)(degree Celsius/centimeter) at 24 degrees Celsius mean temperature and (d) is measured in terms of kilograms per cubic meter).

4. Blowing insulation as claimed in claim 1 wherein the prisms, approximate cubes, and flakes are diamond-shaped in plan view.

5. Blowing insulation as claimed in claim 1 wherein the prisms, approximate cubes, and flakes are substantially square in plan view.

6. Blowing insulation as claimed in claim 1 wherein the prisms, approximate cubes, and flakes are triangular in plan view.

7. Blowing insulation comprising columns each having a maximum dimension several times greater than either of two other dimensions measured at right angles to the maximum dimension, the columns having been cut from a generally laminated blanket of bonded glass fibers in such a manner that the maximum dimension of each column initially extends in the direction of a minimum dimension or thickness of the blanket, and being subject, due to their generally laminated structure, to breaking up at random into fibrous glass prisms, approximate cubes, and flakes of various thicknesses upon being handled after they are cut from the blanket.

8. Blowing insulation comprising fibrous glass prisms, approximate cubes, and flakes of various thicknesses formed upon the handling of the columns as claimed in claim 7.

9. Blowing insulation comprising fibrous glass prisms, approximate cubes, and flakes of various thicknesses, formed by delamination of columns at random upon handling, the columns having been cut from a generally laminated blanket of bonded glass fibers in such a manner that a maximum dimension of each column initially extends in the direction of a minimum dimension or thickness of the blanket, and the blowing insulation having a density of between 0.3 and 0.6 pounds per cubic foot (between 4.81 and 9.62 kg. per cubic meter) in a blown condition.

10. Blowing insulation as claimed in claim 9 and having a density of between 0.45 and 0.55 pounds per cubic foot (7.21 and 8.82 kg. per cubic meter) in a blown condition.

11. Blowing insulation as claimed in claim 9 and having a density of between 0.47 and 0.52 pounds per cubic foot (7.53 and 8.34 kg. per cubic meter) in a blown condition.

12. Blowing insulation comprising fibrous glass prisms, approximate cubes, and flakes of various thicknesses, formed by delamination of columns at random upon handling, the columns having been formed by the multiple slitting of an elongated fibrous glass blanket longitudinally and through its thickness to provide a plurality of strips and by the cutting of the strips, through the thickness and generally crosswise of the blanket but at an angle other than a right angle to its length, repeatedly at intervals spaced longitudinally of the blanket, and the blowing insulation having a product of conductivity (k) and density (d) of less than 0.27 in a blown condition, where (k) is measured in terms of British thermal units/(hour)(square foot)(degree Fahrenheit/inch) at 75 degrees Fahrenheit mean temperature and (d) is measured in terms of pounds per cubic foot (less than 5.37 in a blown condition, where (k) is measured in terms of calories/(hour)(square centimeter)(degree Celsius/centimeter) at 24 degrees Celsius mean temperature and (d) is measured in terms of kilograms per cubic meter).

13. Blowing insulation comprising columns formed by the multiple slitting of an elongated fibrous glass blanket longitudinally and through its thickness to provide a plurality of strips and by the cutting of the strips, through the thickness and generally crosswise of the blanket but at an angle other than a right angle to its length, repeatedly at intervals spaced longitudinally of the blanket, the columns being subject to breaking up at random into fibrous glass prisms, approximate cubes, and flakes of various thicknesses upon being handled after they are cut from the blanket.

14. Blowing insulation comprising fibrous glass prisms, approximate cubes, and flakes of various thicknesses formed upon the handling of the columns as claimed in claim 13.

15. Blowing insulation comprising the product formed by the multiple slitting of an elongated fibrous glass blanket longitudinally and through its thickness to provide a plurality of strips and by the cutting of the strips, through the thickness and generally crosswise of the blanket but at an angle other than a right angle to its length, repeatedly at intervals spaced longitudinally of the blanket.

16. Blowing insulation comprising the product formed by the multiple slitting of an elongated fibrous glass blanket longitudinally and through its thickness to provide a plurality of strips and by the cutting of the strips repeatedly at intervals spaced longitudinally of the blanket with a cutting roll having helical cutting edges.

17. A process of making blowing insulation comprising cutting an elongated generally laminated blanket of bonded glass fibers longitudinally into a plurality of strips and cutting the strips generally transversely into columns in such a manner that a maximum dimension of each column initially extends in the direction of a minimum dimension or thickness of the blanket and the maximum dimension of each column is several times greater than either of two other dimensions measured at right angles to the maximum dimension, and delaminating the columns by subjecting them to further handling to effect the breaking up thereof at random into smaller prisms, approximate cubes, and flakes of various thicknesses.

18. A continuous process of making blowing insulation comprising continuously forming glass fibers from molten glass, spraying the fibers with a thermosetting resin, continuously collecting the sprayed fibers on a moving conveyor to form a continuous generally laminated fibrous glass blanket, conveying the blanket through an oven to cure the binder, cutting the blanket longitudinally into a plurality of strips and cutting the strips generally transversely of but at an angle other than a right angle to their longitudinal edges into columns in such a manner that a maximum dimension of each column initially extends in the direction of a minimum dimension or thickness of the blanket and the maximum dimension of each column is several times greater than either of two other dimensions measured at right angles to the maximum dimension, and delaminating the columns by subjecting them to further handling to effect the breaking up thereof at random into smaller prisms, approximate cubes, and flakes of various thicknesses.

19. A process of making blowing insulation comprising multiply slitting an elongated fibrous glass blanket longitudinally and through its thickness to provide a plurality of strips and cutting the strips, through the thickness and generally crosswise of the blanket but at an angle other than a right angle to its length, repeatedly at intervals spaced longitudinally of the blanket.

20. A continuous process of making blowing insulation comprising continuously forming glass fibers from molten glass, spraying the fibers with a thermosetting resin, continuously collecting the sprayed fibers on a moving conveyor to form a continuous elongated fibrous glass blanket, conveying the blanket through an oven to cure the resin, multiply slitting the blanket longitudinally and through its thickness to provide a plurality of strips, and cutting the strips, through the thickness and generally crosswise of the blanket but at an angle other than a right angle to its length, repeatedly at intervals spaced longitudinally of the blanket.

21. A process as claimed in claim 19 or claim 20 wherein the repeated cutting of the strips is effected by a cutting roll having helical cutting edges.

* * * * *

Notice of Adverse Decision in Interference

In Interference No. 101,191, involving Patent No. 4,296,164, R. S. Bemis and D. A. McCartan, FIBROUS GLASS BLOWING INSULATION AND PROCESS, final judgment adverse to the patentees was rendered July 14, 1986, as to claims 7, 8 & 17.

[*Official Gazette October 7, 1986.*]